ROTATION AND SIZE INVARIANT SHAPE RECOGNITION APPARATUS
Filed July 8, 1964
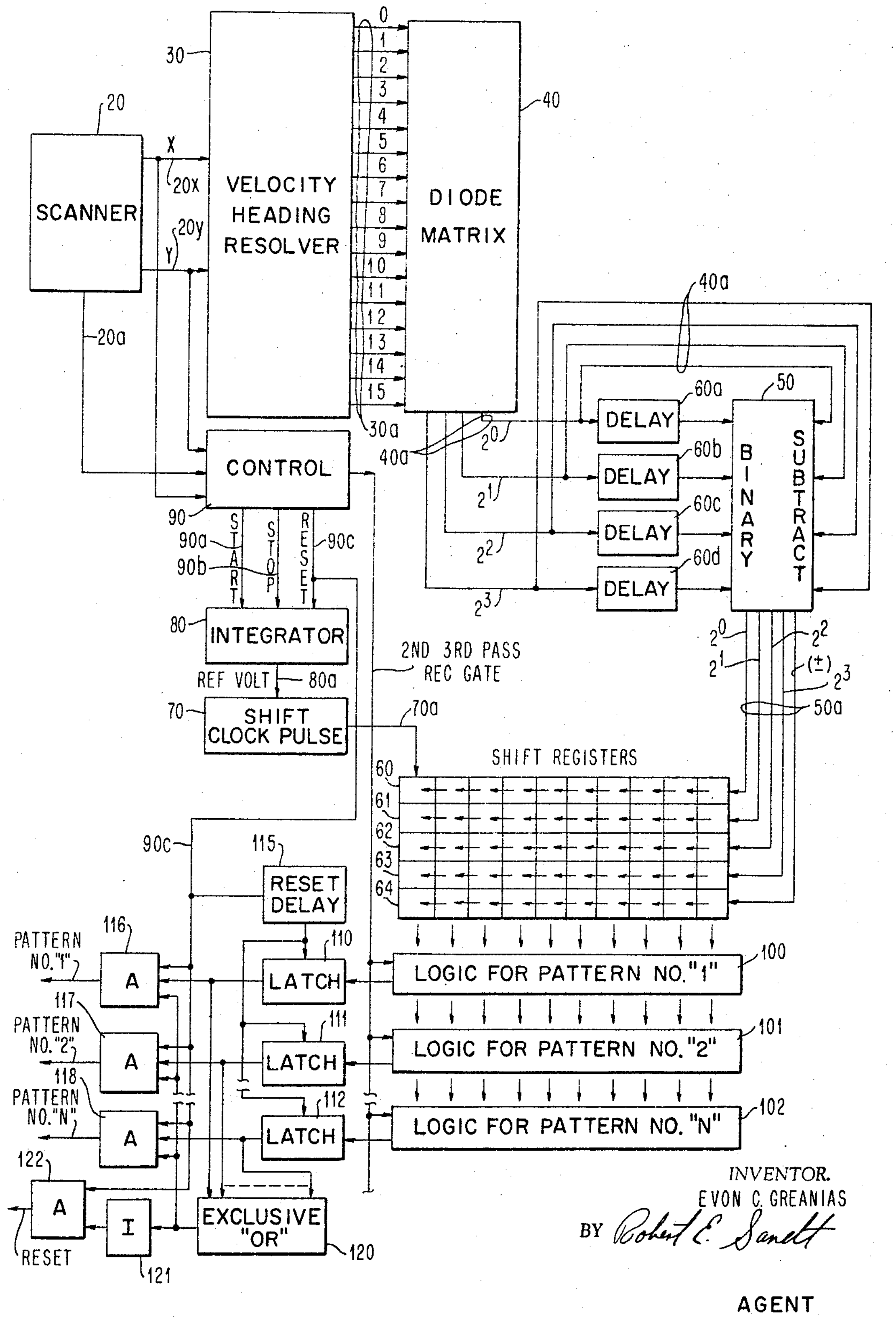
INVENTOR.
EVON C. GREANIAS
BY Robert E. Sandt
AGENT 3,273,124
ROTATION AND SIZE INVARIANT SHAPE RECOGNITION APPARATUS

Evon C. Greanias, Chappaqua, N.Y., assignor to International Business Machines Corporation, New York, N.Y., a corporation of New York

Filed July 8, 1964, Ser. No. 381,134
5 Claims. (Cl. 340—146.3)

This invention relates to apparatus for identifying predetermined shapes, and more particularly to a shape recognition apparatus which is insensitive to the angular orientation and size of the shape.

While a limited degree of rotational invariance is desirable in an apparatus for identifying lexical symbols, complete rotational invariance is obviously undesirable because it will give rise to conflicts in identification between various symbols. Two examples of such conflicts are the "6" versus "9," and the "M" versus "W." It is only in the identification of shapes wherein the angular orientation has no significance that complete rotational invariance becomes an asset.

Rotational invariance and magnification invariance is desirable in machines designed to recognize geometric shapes or characteristic shapes. Machines for reading map symbols, for interpreting engineering drawings particularly electronic circuit diagrams, for examining microscopic specimens including blood samples or other biological specimens are but a few examples. All of the shapes in these various specimens all enjoy the common characteristic that their orientation has no significance. A blood cell, for example, retains its characteristics independent of the orientation of the slide. A gun emplacement or parked airplane in an aerial photograph may be rotated at any angle depending not only on its placement on the ground, but also its relativity to the film in the camera. It is for the recognition of the broad class of shapes wherein angular displacement has no significance that the present invention is directed.

The present invention achieves the magnification and rotation invariance by tracing the outline of the unknown shape with an electronic curve follower to obtain time variant analog manifestations of the configuration of the shape. These analog manifestations are converted into a succession of binary words which define the shape. This succession of binary words which define the measured characteristics of the shape is then compared in parallel with a like succession of words which define all of the known shapes from which identification is sought. To compensate for rotation, the succession of words defining the specimen shape is processed one word position at a time to effect all of the relative angular orientations and thus produce the rotation invariance.

By suitably normalizing the size of each specimen shape to a fixed number of words, the magnification of the specimen is rendered invariant also. This is achieved by first measuring the perimeter of the shape and then adjusting the measuring apparatus to sample at time intervals inversely proportional to the perimeter of the shape. Thus, a given shape having a perimeter P traversed in T seconds would be sampled every T/N seconds or P/N units of length. A shape of the same configuration but at half magnification would be sampled every T/2N seconds or P/2N units of length. Both shapes would yield N binary words as a definition of the shape.

It is, therefore, an object of this invention to produce a shape recognition machine which is invariant with respect to the angular rotation of the shape whose identity is sought to be established.

A further object of the invention is to produce a shape recognition machine which is invariant with respect to the magnification of the shape whose identity is sought to be established.

Another object of the invention is to provide a shape recognition machine which follows the outline of the shape whose identity is sought to be established and produces a succession of a given number of binary words which define the shape which succession of words it compares in parallel with a corresponding succession of words defining all of the known shapes by one word position until all relative orientations have been achieved.

Yet another object of the invention is to provide a shape recognition machine which follows the outline of an unknown shape at a constant speed and yields a succession of binary signals manifestive of the successive headlines of the constant speed velocity vector, and subtracts successive pairs of the vector heading signals to obtain a succession of difference words which defines the shape and then compares this succession of words in all possible relative orientations with a like succession of words which define all of the known shapes among which recognition is sought.

The foregoing and other objects, features and advantages of the invention will be apparent from the following more particular description of a preferred embodiment of the invention, as illustrated in the accompanying drawing.

In the drawing:

The FIGURE constitutes the sole drawing.

In the figure, reference may be had to co-pending applications for a detailed description of the component parts of the apparatus. Only as much detail as is required for an understanding of the functional operation of each component will be described herein.

As has been stated, the apparatus functions to recognize visible shapes by tracing their outline with an electronic curve follower. In the figure, the scanner 20 represents a device which illuminates the unknown shape with an animated spot of light to follow the configuration thereof and yield time variant electrical waveforms which represent the successive instantaneous horizontal and vertical displacements of the configuration of the shape as a function of time. These waveforms, if applied to the deflection circuits of a cathode ray tube would reproduce the unknown shape on the tube face. These time variant waveforms appear as variable voltages on the lines 20$x$ and 20$y$. This apparatus is fully described in one or more of the co-pending applications of Evon C. Greanias, Ser. No. 248,585, filed Dec. 31, 1962, now U.S. Patent No. 3,229,100, issued on Jan. 11, 1966; or Greanias et al., Ser. No. 306,119, filed Sept. 3, 1963; or Greanias et al., Ser. No. 305,254, filed Aug. 29, 1963.

The horizontal and vertical displacement voltages on the lines 20$x$ and 20$y$ are continuously processed in the velocity heading resolver 30. Here, the voltages representing the horizontal and vertical displacements are continuously differentiated to obtain the first differentials thereof. These first differentials represent respectively $\dot{X}$ and $\dot{Y}$, or the horizontal and vertical velocity components. By dividing $\dot{X}$ and $\dot{Y}$, equating the quotient to the tangents of the angles 11¼°, 33¾°, 56¼°, and 78¾° and logically combining the signs of $\dot{X}$ and $\dot{Y}$, the velocity vectors may be apportioned into sixteen sectors corresponding to the headings N, NNE, NE, ENE, E, ESE, SE, SSE, S, SSW, SW, WSW, W, WNW, NW and NNW. For example, if the quotient of $\dot{X}$ divided by $\dot{Y}$ is less than the tangent of 11¼°, then the heading must be North or South. A positive $\dot{Y}$ resolves the conflict in favor of a North heading. A quotient value greater than the tangent of 33¾°, but less than 56¼°, measures a heading of NE, SE, SW, or NW. The combinations of positive and negative signs resolves the conflict. First quadrant headings require positive $\dot{X}$ and positive $\dot{Y}$. Second quadrant headings require a negative $\dot{X}$ and positive $\dot{Y}$. Third quadrant requires $-\dot{X}$, and $-\dot{Y}$, while fourth quadrant requires $+\dot{X}$ and $-\dot{Y}$. By logically combining the four quadrant combinations with the four basic angular orientations, the sixteen headings are obtained. These heading signals appear as individual signals on the lines 30*a* wherein the numbers 0 through 15 represent the respective decimal values of the headings rotating clockwise from the North. Thus, with 0 representing North, NE is represented by the 2 line, and WNW by line 13, to name but a few. Apparatus for processing time variant displacement voltages and yielding heading signals in the manner of the velocity heading resolver 30 is fully disclosed in co-pending application of Greanias et al., Ser. No. 305,464, filed Aug. 29, 1963.

The signals appearing on the lines 30*a* are converted in well known fashion to four bit binary numbers in the diode matrix 40. Here, for example, a more positive status of line 13 would produce more positive responses on lines $2^3$, $2^2$, and $2^0$, because the 13 line would be diode connected to all lines except to the $2^1$ line. Thus, the velocity headings obtained by the element 30 will be converted by the diode matrix 40 to yield the following signals:

| | | | |
|---|---|---|---|
| N | 0000 | S | 1000 |
| NNE | 0001 | SSW | 1001 |
| NE | 0010 | SW | 1010 |
| ENE | 0011 | WSW | 1011 |
| E | 0100 | W | 1100 |
| ESE | 0101 | WNW | 1101 |
| SE | 0110 | NW | 1110 |
| SSE | 0111 | NNW | 1111 |

The lines 40*a* will yield successive binary signals indicative of the heading of trace. For example, if a circle were being traced in a clockwise direction starting with a north vector, the succession of signals on the lines 40*a* would be in accordance with the foregoing table. These signals on the lines 40*a* are connected directly to the binary full subtractor 50, and indirectly thereto through the individual delay units 60*a* through 60*d*. These delay units pass on the potential status on the lines 40*a* with a constant delay. If the delayed signals are subtracted from the direct signals (although it makes no difference), it is as if of two successive vector heading representations, the trailing vector representation is subtracted from the leading one. Thus, in the circular clockwise trace, the difference signals would have a constant value plus one until the transition from NNW to N when the difference would be minus 1111 (−15).

The binary subtract unit 50 may have any one of many circuits, but it must yield the binary difference and sign on the respective ones of the lines 50*a*. A binary full adder may be used and the subtrahend introduced as a complement. If no carry out of the highest order occurs, the bit status of the adder is complemented for readout and a negative sign signalled for the difference. If an overflow occurs out of the highest order, a one is added to the lowest order and a positive difference signalled. Thus, when 1111 (NNW) is subtracted from 0000 (N), it is as if 0000 and 0000 are added to yield 0000. However, since no overflow occurs, the 0000 sum is complemented to 1111 and the negative sign appended. Thus, in the circular trace, the binary subtract unit 50 would yield a succession of differences consisting of a succession of fifteen repetitions of the word +0001 followed by one −1111. A circle can thus be defined as the following succession of words:

| | | |
|---|---|---|
| +0001 | +0001 | −1111 |
| +0001 | +0001 | |
| +0001 | +0001 | |
| +0001 | +0001 | |
| +0001 | +0001 | |

From the foregoing word succession, it is apparent that the origin of the trace of the unknown shape must be angularly aligned with the reference data if a comparison is to be made. Even though a circle has a constant difference of plus 0001, there is one difference of minus 1111. Were a comparison attempted, this one word if it were misaligned would cause a failure of comparison. If, however, the succession of difference signals representing the unknown shape is continuously generated and the succession continually precessed by one word position at a time and compared upon each such precession, then sooner or later the −1111 will align with its stored counterpart to effect the recognition.

The foregoing precession is achieved by entering the binary differences and sign appearing on the lines 50*a* into the low order positions of five shift registers 60, 61, 62, 63, and 64 whenever a clock shift pulse appears on the line 70*a*, which shift pulse also shifts the binary bit manifestations standing in each order of the respective orders of the shift registers one position to the left. Thus, with the shift registers reset and the word succession for the circular trace, a succession of +0001 would be shifted up the orders of the shift registers 60 through 64 until the final −1111 would be entered into the low order. Continued entry and shifting would precess the −1111 up the orders in the shift register while +0001 was being re-entered into the low order and shifted upwards. Thus, by successive shifts each separate word will at some time occupy each one of the separate orders of the shift registers and the order of the succession will remain unchanged, if one considers the succession as a sort of closed ring.

The shift registers 60 through 64 are shown schematically to include ten orders. While this number is arbitrarily chosen, once it is so chosen it must be fixed, as all of the reference patterns are premised on it. With the ten orders there must be ten samples taken at fixed points along the periphery of the unknown shape, independent of the length thereof. This sampling is controlled by the frequency of the clock pulses produced by the shift clock pulse generator 70. This device is in essence a variable frequency oscillator together with circuits for producing square wave pulses therefrom. The frequency of the clock pulse generator is controlled by the magnitude of the reference voltage on the line 80*a* coming from the integrator 80.

The integrator 80 measures the periphery of the unknown shape. As has been stated, the scanner 20 follows the outline of the unknown shape at a constant speed. Thus, since distance equals the product of speed and time, the peripheral distance is a linear function of the elapsed time, so long as speed remains constant. This simple relationship is exploited, together with the phenomenon that the voltage charge in a capacitor is a linear function of time when the charging current is held constant, to produce the reference voltage appearing on the line 80*a*. The integrator 80 contains a constant current source for charging a capacitor, a gate for connecting the current source to the capacitor and a gate for discharging the capacitor. The voltage on the line 80*a* is taken from the capacitor through a very high impedance amplifier so to have the capacitor charge potential available as a control without discharging it. The start signal on line 90*a* sets a latch which opens the gate to permit the charging current to charge the capacitor. The stop signal on line 90*b* resets the latch to close the gate and stop the charging.

Once the capacitor is charged, its charge remains effective to produce the reference voltage (through the high impedance amplifier) on line 80*a*. The reset signal on line 90*c* opens the discharge gate to discharge the capacitor to ground. The integrator circuit for accumulating a charge proportional to time is shown in co-pending application Ser. No. 305,255, filed Aug. 29, 1963.

The scanner 20 makes a first pass around the unknown shape at a constant speed. During the first pass, the integrator 80 is accumulating charge. If the unknown shape has a long periphery, the transit time thereabout will be long, in fact, directly proportional to the length. Since the capacitor charge is a linear function of time, then the capacitor charge is a linear function of the peripheral length of the unknown shape. The voltage on the line 80*a* will, therefore, be a linear function of the length of the perimeter of the unknown shape. This reference voltage, therefore, necessarily produces an inverse linear control over the frequency of shift clock pulse generator 70. Since this clock pulse generator must yield ten pulses per complete trace about any size shape, it necessarily follows that small shapes will yield a smaller reference voltage and require higher frequency clock pulses.

The control circuits 90 are substantially those shown in co-pending application of Greanias et al., Ser. No. 305,254, filed Aug. 29, 1963. Basically, it measures the completion of a complete trace about the unknown shape. As is explained in the referenced application, the scanner 20 is positioned adjacent to the unknown shape by raster search potentials applied to summing amplifiers which feed the deflection circuits of a cathode ray tube flying spot scanner. When the spot animated in the raster search pattern intercepts the unknown shape, the change in reflected illumination is detected by a photocell which, through appropriate circuitry, freezes the raster search potentials and initiates the follower action. This is the start signal that appears on the line 90*a*.

The follower action of the scanner 20 is achieved by integrating sine waves of two different amplitudes and phases as explained in the referenced application Ser. No. 248,585. These integrators are initially reset to zero during the search operation and only integrate during the follower action. Thus, upon the initial intercept with the unknown shape, the integrators within the scanner 20 have zero potential therein. The potentials on the lines 20*x* and 20*y* are, therefore, also zero. As the trace proceeds away from the point of initial intercept the voltages on the lines 20*x* and 20*y* will rise and fall in accordance with the relativity of the instantaneous displacements with respect to the starting point. When the trace completes a cycle of the unknown shape and returns to its starting point, the displacements will again be zero, zero and the potentials on the lines 20*x* and 20*y* will return to zero. Thus, the control circuits 90 include null detectors and an AND gate. Whenever both the *x* and the *y* null detectors register zero voltage, the scanner 20 is at the initial intercept point. A simple counter connected to the AND gate operated by the null detectors keeps track of the number of cycles around the shape. Thus, the start signal on line 90*a* occurs upon the initial intercept with the counter reset to zero. The stop pulse on line 90*b* would occur upon the next return to the initial point when the counter steps to one. Since, for reasons to be explained, at least three traces around the shape are required the reset pulse on line 90*c* will occur upon the completion of the third pass as counted by the counter.

It has been explained how the time variant analog displacement voltages are differentiated to obtain orthogonal velocity component voltages which are processed to yield heading signals. So, too, has it been explained how these heading signals are converted to binary notations and the difference between the delayed and undelayed binary signals obtained to yield a succession of four bit binary words and sign to define the configuration of the shape. This succession of binary words appears on the lines 50*a*.

However, they are only permitted to enter the shift registers 60 through 64 when the shift clock pulse generator 70 produces a pulse on the line 70*a*. Thus, although there might be one hundred words produced on the lines 50*a* only ten will be entered into the shift registers. In the example chosen, every tenth word would thus be entered.

Identification of the shape is achieved by providing a comparison matrix for each of the known shapes against which comparison is to be effected. These matrices are shown as the boxes 100, 101, 102. Each of these boxes contains an individually wired 5 x 10 comparison matrix wherein the zero and one patterns that define the given shape is wired into the matrix. Each of the ten separate orders of the five shift registers 60 through 64 is wired to a corresponding matrical position in each of the logic matrices 100, 101, 102. As the binary words shift through the shift registers, they are thus compared against all of the stored words in all possible relativities to obtain the rotation invariance. As soon as any one of the logic matrices 100, 101, 102 registers a match with the succession of words in the shift registers, it sets a corresponding latch 110, 111, 112. At the end of the third pass around the shape, the reset pulse on line 90*c* resets the latches 110, 111, and 112 through the reset delay 115, which delay permits the use of the latch setting before it is reset. The reset pulse on line 90*c* also enters each of the AND gates 116, 117, and 118 to permit them to read out the status of the recognition latches 110, 111, or 112 provided that no more than one latch is set. This exclusive condition is tested by the EXCLUSIVE OR gate 120 which receives inputs from all of the latches. If one and only one latch is set, then gate 120 yields an output to complete the energization for one of the AND gates 116, 117, or 118. If more than one recognition latch is set, the EXCLUSIVE OR gate 120 will yield no output, thus depriving the AND gates 116, 117, and 118 of their requisite potential to prevent a readout upon a conflict in recognition. The output from gate 120 is inverted in inverter 121 which through AND gate 122 produces an output response if either none or more than one of the recognition latches is set. This produces a reset operation and signals for a repeat try.

As has been stated, the first pass around the unknown shape accumulates a potential in the integrator 80 to set the frequency of the clock pulse generator 70 to adjust the sampling rate to achieve ten samples per trace around the shape. This clock pulse generator shifts the words which describe the shape through the shift registers for comparison with all of the known shapes. Since the relative orientation may have any angular disposition, it is necessary to trace around the shape at least twice while the words are being shifted in the register. This will insure that each word will at some time occupy each different order in the shift registers.

While no attempt has been made to tabulate the succession of words that define given shapes, it should be quite apparent that the apparatus may be employed, so to speak, to generate its own truth table. If the apparatus is used to trance a known standard shape, then the succession of words that would be shifted out of the high orders of the shift registers 60 through 64 would be the succession of words that define the known shape. By recording this succession of words on magnetic tape, or other medium, the record may then be printed out in some visible form and used as a guide in wiring the logic in the matrices 100, 101, and 102. By measuring a sufficient number of samples whose identities are known, the logic may be made as definitive or as loose as a statistical study indicates is necessary. In some instances, majority logic may be employed, so that if the majority of the ten words are satisfied, recognition is achieved. So, also, may the resolution be made coarser or finer by appropriate adjustment of the number of orders in the shift registers and in the number of matrix positions.

In summary, it can now be appreciated that the apparatus is rotation invariant because the succession of words that defines the unknown shape is shifted completely through the shift registers so that each word occupies each different register order, and all orders contain words. The apparatus is size invariant because a fixed number of words is taken for all shapes, independent of their size. The sampling intervals are increased or decreased as a linear function of the perimeter of the shape.

In the same fashion that the apparatus may be employed to assist in the design of its own logic, it can also produce records which may be processed on a general purpose digital computer. The shift clock pulses may be employed to gate out the succession of words which defines the unknown shape. This succession of words may be entered into the buffer storage of a general purpose computer and there processed by comparing against stored succession of words to achieve the recognition.

While the invention has been particularly shown and described with reference to a preferred embodiment thereof, it will be understood by those skilled in the art that various changes in form and details may be made therein without departing from the spirit and scope of the invention.

What is claimed is:

1. A shape identification apparatus comprising:
(a) follower means for following the outline of an unknown shape and producing time variant analog waveforms manifestive of the configuration of the shape;
(b) means for processing said waveforms to produce a succession of binary numbers manifestive of the successive directions of movement of said follower means in following the outline of the shape in a closed trace thereof;
(c) means for obtaining the difference of successive pairs of said binary numbers to produce a succession of binary words equal to the binary difference and the algebraic sign of the differences, each of said pairs of binary numbers including one number from the preceding pair and occurring at predetermined fixed time intervals during the follower action;
(d) means responsive to the peripheral length of the shape being followed for sampling the succession of binary words at time intervals, the duration of which is a linear function of the periphery of the shape;
(e) means for comparing the sampled words with a stored succession of words defining all of the known shapes among which recognition is sought; and
(f) means for precessing the sampled succession of words with respect to the stored succession of words to correct for angular orientation of the unknown shape.

2. A shape identification apparatus comprising:
(a) follower means for following the outline of the shape to be identified at constant speed and producing time variant analog waveforms manifestive of the configuration of the shape;
(b) means processing said waveforms to produce a succession of binary numbers manifestive of the successive direction of movement achieved by said follower means in following the outline of the unknown shape;
(c) means for delaying the binary numbers by a fixed time delay;
(d) means for obtaining the difference between the delayed and the non-delayed binary numbers to yield a succession of binary words consisting of the differences of the successive pairs of numbers and the algebraic sign thereof;
(e) measuring means for measuring the peripheral length of the shape to be identified and producing N signals equally spaced about the periphery of the shape;
(f) a plurality of shift registers each having N orders;
(g) means responsive to the occurrence of each of said N signals for entering the then occurring one of said succession of words into the lowest orders of said shift registers and shifting the words previously entered;
(h) means storing a succession of words defining known shapes; and
(i) means operative upon every shift of the words in said shift registers for comparing the stored words with the words in said shift registers.

3. A shape identification apparatus comprising:
(a) means for generating time variant analog waveforms manifesting the displacement curve of the unknown shape as a function of time;
(b) means for processing said waveforms to obtain a first succession of binary words representing the successive slopes of the displacement curve;
(c) means producing a second succession of binary words each of which is the algebraic binary difference between successive word pairs in said first succession of words wherein each pair includes one word from the preceding pair and the paired words are separated by a fixed time interval;
(d) means for sampling said second succession of words to produce a third succession of words containing an invariant quantity of words separated by equal time intervals;
(e) means for shifting said third succession of words past a plurality of successions of words defining a plurality of known shapes in a number of shifts equal to the invariant quantity minus one; and
(f) means operative at each shift position for comparing said third succession of words against the succession of words defining the known shape and registering a match.

4. A shape identification apparatus comprising:
(a) a curve following apparatus for following the outline of an unknown shape in a closed trace and generating time variant analog waveforms representing the displacement curve of the trace as a function of time;
(b) a resolver for processing said analog waveforms and producing a succession of digital signals manifestive of the successive headings of the trace as a function of time;
(c) means for converting the succession of digital signals into a succession of binary words representing the succession of shapes;
(d) means for obtaining the difference between each successive pair of binary words wherein each pair of words is separated by a fixed time interval, and producing a second succession of words each consisting of the binary bit difference and a bit representing the algebraic sign of the difference;
(e) means for sampling a predetermined number of said second succession of words at equal intervening time intervals to obtain a definition of the shape consisting of the sampled difference words; and
(f) means for comparing the definition of the shape against a succession of words defining known shapes in all relative dispositions of the word successions.

5. A shape recognition apparatus comprising:
(a) follower means for following the outline of the unknown shape in a succession of closed traces and producing time variant analog waveforms manifestive of the displacement curve of the traces as a function of time;
(b) measuring means operative on a first trace of the shape to measure the perimeter thereof and producing a control potential proportional thereto;
(c) means for processing said analog waveforms to produce a first succession of binary words representing the successive slopes of the traces;
(d) means for delaying each of said binary words by a fixed time delay;

(e) means for obtaining the difference between an undelayed binary word and a delayed binary word to produce a second succession of words comprising the binary differences and the sign of the differences;

(f) means under control of said measuring means for sampling said second succession of words at time intervals which are a linear function of the periphery of the shape;

(g) means for comparing the succession of sampled words with a plurality of successions of stored words defining known shapes and producing a recognition signal; and (h) means for shifting the sampled succession of words relative to the stored successions in all possible orientations.

References Cited by the Examiner

UNITED STATES PATENTS

| | | | |
|---|---|---|---|
| 3,196,399 | 7/1965 | Kamentsky et al. | 340—146.3 |
| 3,199,078 | 8/1965 | Gaffney et al. | 340—146.3 |
| 3,213,421 | 10/1965 | Abraham | 340—146.3 |

OTHER REFERENCES

Kamentsky and Liu: "Computer-Automated Design of Multifont Print Recognition Logic," IBM Journal, January 1963, pp. 2–13.

MAYNARD R. WILBUR, *Primary Examiner.*

J. E. SMITH, *Assistant Examiner.*